US010925218B2

(12) United States Patent
Flanhardt et al.

(10) Patent No.: US 10,925,218 B2
(45) Date of Patent: Feb. 23, 2021

(54) FLAIL ASSEMBLY FOR A STRAW CHOPPER SHAFT WITH A MOUNTING HOLE IN A BRACKET AND SUCH A STRAW CHOPPER SHAFT

(71) Applicant: Rasspe Systemtechnik Gmbh, Wermelskirchen (DE)

(72) Inventors: Michael Flanhardt, Langenfeld (DE); Andreas Acimas, Solingen (DE); Hans-Robert Lüttich, Dohna (DE); Katharina Anders, Dohna (DE)

(73) Assignee: Rasspe Systemtechnik Gmbh, Wermelskirchen (DE)

( * ) Notice: Subject to any disclaimer, the term of this patent is extended or adjusted under 35 U.S.C. 154(b) by 198 days.

(21) Appl. No.: 16/189,333

(22) Filed: Nov. 13, 2018

(65) Prior Publication Data

US 2019/0141904 A1    May 16, 2019

(30) Foreign Application Priority Data

Nov. 15, 2017    (DE) .......................... 102017126839.1

(51) Int. Cl.
*A01F 29/09*    (2010.01)
*A01F 12/40*    (2006.01)

(52) U.S. Cl.
CPC ............ *A01F 29/095* (2013.01); *A01F 12/40* (2013.01); *A01F 2009/00* (2013.01)

(58) Field of Classification Search
CPC ........ A01F 29/095; A01F 29/00; A01F 29/02; A01F 29/09; A01F 12/40; A01F 2009/00
See application file for complete search history.

(56) References Cited

U.S. PATENT DOCUMENTS

| 2,627,158 A | * | 2/1953 | Van Sickle | .......... A01D 89/002 56/364 |
| 2,767,020 A | * | 10/1956 | Knowles | ................. C02F 3/043 239/450 |
| 3,068,633 A | * | 12/1962 | Taylor | .................. A01D 34/733 56/295 |

(Continued)

FOREIGN PATENT DOCUMENTS

| EP | 0 277 129 B1 | 3/1992 |
| EP | 1 757 183 A1 | 2/2007 |

(Continued)

*Primary Examiner* — Abigail A Risic (74) *Attorney, Agent, or Firm* — Sughrue Mion, PLLC (57) ABSTRACT

A flail assembly for a straw chopper shaft including: a bolt element passing through the mounting hole of the bracket, an anti-rotation element supporting the bolt element on the bracket against rotation, a first flail having a bore and being seated on the bolt element with said bore, a first fastening element connected to a first free end portion of the bolt element, and a first washer having a bore with which the first washer is seated on the bolt element. The first washer is between the first fastening element and the first flail, and is radially slotted. The bolt element is axially braced with the first fastening element relative to the longitudinal axis of the bolt element and a smallest cylindrical envelope of the first fastening element coaxial with a longitudinal axis of the bolt element has a smaller radius than the bore of the first flail.

16 Claims, 7 Drawing Sheets

(56) References Cited

U.S. PATENT DOCUMENTS

| | | | | |
|---|---|---|---|---|
| 3,309,854 | A * | 3/1967 | Mitchell | A01D 34/535 |
| | | | | 56/504 |
| 3,717,062 | A * | 2/1973 | Gaeddert | A01F 29/095 |
| | | | | 241/292.1 |
| 3,874,604 | A * | 4/1975 | Gronberg | A01F 29/04 |
| | | | | 241/243 |
| 4,998,679 | A * | 3/1991 | Bender | A01F 29/02 |
| | | | | 241/243 |
| 6,829,879 | B2 * | 12/2004 | Weichholdt | A01F 12/40 |
| | | | | 460/112 |
| 8,298,058 | B2 * | 10/2012 | Lauer | A01F 12/40 |
| | | | | 460/122 |
| 2003/0060246 | A1 * | 3/2003 | Bueermann | A01F 12/40 |
| | | | | 460/112 |
| 2003/0125098 | A1 * | 7/2003 | Weichholdt | A01F 12/40 |
| | | | | 460/112 |
| 2006/0073861 | A1 * | 4/2006 | Lauer | A01F 12/40 |
| | | | | 460/112 |
| 2016/0113202 | A1 * | 4/2016 | Mayerle | A01F 29/04 |
| | | | | 460/112 |

FOREIGN PATENT DOCUMENTS

| | | |
|---|---|---|
| EP | 1 757 183 B1 | 2/2009 |
| FR | 2 479 646 A1 | 10/1981 |
| WO | 91/10351 A1 | 7/1991 |

* cited by examiner

FLAIL ASSEMBLY FOR A STRAW CHOPPER SHAFT WITH A MOUNTING HOLE IN A BRACKET AND SUCH A STRAW CHOPPER SHAFT

BACKGROUND OF THE INVENTION

Field of the Invention

The present invention relates to a flail assembly for a straw chopper shaft with a mounting hole in a bracket, in particular for agricultural harvesting machines, comprising a bolt element which can be passed through the mounting hole of the bracket and an anti-rotation element by means of which the bolt element can be supported against rotation on the bracket. A first fastening element is connected to a first free end portion of the bolt element. A first flail and a first washer each sit with a bore on the bolt element, the first washer being located between the first fastening element and the first flail.

Background

Straw chopper shafts are used, among other things, in agricultural harvesting machines to distribute the straw produced during the harvesting process in a chopped form as natural fertilizer over a large area of the field. In addition to chopping the straw, the straw chopper shaft also performs the function of distributing the straw uniformly over the cutting width by generating an air flow in radial and axial direction. Chopping of the straw is achieved by means of flails attached to the straw chopper shaft, which flails can have cutting edges and rotate through a fixed counter-structure, which can also have cutting edges. The flails can either be pendulum mounted, while the straw chopper shaft will rotate, centrifugal forces will align said flails radially outward in an upright position, or they can be fixedly mounted. The flail assembly is designed to allow the flails to be attached to the straw chopper shaft bracket, which has a mounting hole, while allowing disassembly for replacement of wearing parts. Turning or replacing the flails is necessary in the event of unforeseeable damage, for example due to foreign bodies in the chaff, and regularly every 200 operating hours, as the cutting edges become blunt with increasing operating time and the power requirement of the straw chopper shaft increases with poor chopper quality. The replacement of all flails of a chopper shaft usually takes several hours.

From the U.S. Pat. No. 6,829,879 B2 a flail assembly of the type mentioned at the beginning is known. The bolt element and the anti-rotation element are connected to each other and secured against rotation by the bracket. For this purpose, a part of the anti-rotation element is guided through the mounting hole in the bracket. This part is complementary to the mounting hole of the bracket, the shape of the mounting hole being different from a circular one, in particular oval or rectangular. The disadvantage of this flail assembly is that the mounting hole of the bracket is specified by the harvester manufacturer and is usually circular. Therefore, the proposed flail assembly is generally not suitable for retrofitting. Another drawback is that the two flails cannot be disassembled independently, so the operator must handle both the tool and a variety of assembly parts simultaneously.

EP 1 757 183 B1 describes a further flail assembly which comprises a bolt rigidly connected to the bracket, which in the mounted condition has two free ends to the left and to right of the bracket, on each of which a chopper blade is rotatably mounted. The chopping blades are each secured to the bolt by means of a circular washer, the washers being detachably connected to the bolt by means of a screw connection. The disadvantage of this flail assembly is that the bolt usually has to be press-fitted into the bracket so that retrofitting and dismantling of the described flail assembly cannot be carried out without considerable effort.

The object of the present invention is therefore to provide a flail assembly that allows easy disassembly of all parts of the flail assembly.

SUMMARY OF THE INVENTION

To solve the problem, according to the invention a flail assembly is proposed for a straw chopper shaft with a mounting hole in a bracket, comprising: a bolt element adapted to pass through the mounting hole of the bracket, an anti-rotation element adapted to support the bolt element on the bracket against rotation, a first flail having a bore and being seated with the bore on the bolt element, a first fastening element connected to a first free end portion of the bolt element, and a first washer having a bore with the first washer seated on the bolt element, such that the first washer is disposed between the first fastening element and the first flail, wherein the first washer is radially slotted and the bolt element is axially braced with the first fastening element and the first washer with respect to the longitudinal axis of the bolt element and a smallest cylindrical envelope of the first fastening element coaxial with a longitudinal axis of the bolt element has a smaller radius than the bore of the first flail.

One advantage of the flail assembly is that it can be disassembled by the operator with one hand. Since the bolt element is rotationally fixed to the bracket, only one tool is required to loosen the first fastening element. In one possible embodiment, the first free end portion of the bolt element has at least partially a first thread. The first fastening element is a nut, especially a self-locking nut, which can be loosened and tightened with a standard wrench. As soon as the first fastening element has been loosened to such an extent that there is no more axial bracing between the first fastening element, the first washer and the bolt element, the first radially slotted washer can be removed from the bolt element in the radial direction. This releases the first flail axially and allows it to be completely removed from the bolt element, as the smallest cylindrical envelope of the first fastening element, coaxial with a longitudinal axis of the bolt element, has a smaller radius than the bore of the first flail.

The slotted washer has a bore that can have any other shape besides round that allows the slotted washer to sit on the bolt element, for example polygonal. The size of the bore is selected so that the first fastening element cannot be pushed through in the axial direction when the flail assembly is mounted. Further, the radially slotted washer has a slot extending from the bore to the edge of the washer, the width of which at each location is greater than the diameter of the portion of the bolt element on which the washer is seated in the mounted state. The slot follows an imaginary center line that extends from the center of the bore of the washer to the edge of the washer, either straight or curved, e.g. arcuate or S-shaped.

The length of the first free end portion is selected such that the first fastening element remains connected to the bolt element when loosened and therefore does not need to be stored separately during disassembly. This has the advantage of reducing the risk of loss of the first fastening element.

The fact that the bolt element can be passed through the mounting hole of the bracket and can be supported on the bracket against rotation means that in an assembled state of the flail assembly on the bracket the bolt element is passed through the mounting hole of the bracket and is at least indirectly supported on the bracket against rotation. On the other hand, in a non-mounted condition of the flail assembly on the bracket, the bolt element is not passed through the mounting hole of the bracket and is not supported against rotation on the bracket.

The first flail may have a straight form or a tortuous or spiral form, which in particular can produce an axial component of the resulting airflow. The first flail may be provided with cutting edges on one or both of its long sides or may have no cutting edges, especially if counter knives are provided to move the flails past. The first flail may be made of a metallic material, a ceramic material, plastic or a plastic composite. If the flail is made of a metallic material, one side of the blade may be hardened more than the other, so that the cutting edges sharpen themselves up to a wear limit.

In the flail assembly in accordance with the invention, the bolt element can be supported against rotation by means of an anti-rotation element on the bracket. In one possible embodiment, the anti-rotation element has a supporting surface which, when mounted, is supported on the bracket of the straw chopper shaft in the circumferential direction relative to a longitudinal axis of the bolt element. For this purpose, the bolt element can be designed in one piece with the anti-rotation element in a possible configuration. The brackets of straw chopper shafts often have a largely trapezoidal shape in a cross-section, which is limited radially on the outside by a straight contact surface relative to the respective axis of rotation of the straw chopper shafts. However, any other form of the bracket with a contact surface is conceivable, in particular the contact surface may be curved. The supporting surface of the anti-rotation element can be complementary to the contact surface of the bracket, but at least in such a way that in the assembled state there is a positive form fitting connection between the anti-rotation element and the bracket and thus the anti-rotation element is rotationally fixed with respect to the longitudinal axis of the bolt element. It is irrelevant whether a play, caused for example by tolerances or shape deviations between the anti-rotation element and the bracket, must be overcome first in order to achieve the supported condition of the anti-rotation element. This applies in particular if the flail assembly is transferred from one of the states "released" or "braced" to the other.

In a possible embodiment, the bolt element has a first securing shoulder, the cross-section of which deviates from a circular shape, and the anti-rotation element has a first opening, which is complementary to the first securing shoulder and receives the first securing shoulder in a rotationally fixed manner in the assembled state. The rotationally fixed state shall include a constraint of at least the relative rotational degree of freedom around the longitudinal axis of the bolt element, whereby the other two relative rotational degrees of freedom may also be constrained. It is irrelevant whether a play, for example caused by tolerances or deviations in form between the first securing shoulder and the first opening, must be overcome first in order to achieve the rotationally fixed condition between the securing shoulder and the first opening. This applies in particular if the flail assembly is transferred between the condition "released" and "braced". Thus, the complementary design of the first opening is to be understood as any form which, after turning the bolt element by any angle about its longitudinal axis, permits a positive form fitting between the bolt element and the anti-rotation element. In one possible embodiment, the first securing shoulder of the bolt element in cross-section is composed of an imaginary rectangular central part and two circular segments which are connected to the two opposite short ends of the central part. Such a shape allows a large contact surface to be created between the anti-rotation element and the securing shoulder of the bolt element, which reduces contact pressure and thus wear between the contact partners.

The first flail sits on the bolt element in the flail assembly according to the invention. If the first flail sits directly on the bolt element, the bolt element may have a second bearing shoulder for this purpose. In a possible embodiment a sleeve with a second securing shoulder, the cross-section of which deviates from a circular form, and a first bearing shoulder, on which the first flail is radially mounted, sits on the bolt element and the anti-rotation element has a second opening, which is complementary to the second securing shoulder and receives the second securing shoulder in a rotationally fixed manner in the assembled state. The rotationally fixed state shall include a constraint of at least the relative rotational degree of freedom around the longitudinal axis of the sleeve, whereby the other two relative rotational degrees of freedom may also be constrained. It is irrelevant whether a play caused, for example, by tolerances or deviations in shape between the second security shoulder and the second opening has to be overcome first in order to achieve the rotationally fixed state between the second securing shoulder and the second opening. Thus, the complementary design of the second opening is to be understood as any shape which, after rotating the sleeve by any angle about its longitudinal axis, permits a positive form-fit between the sleeve and the anti-rotation element. On the one hand, the sleeve can take over the function of an axial wear protection between the bracket and the first flail and, on the other hand, it can have a bearing shoulder via which the first flail sits indirectly on the bolt element. In case of wear on the axial surface or the bearing surface of the sleeve, the sleeve can easily be replaced by a spare part.

For axial bracing of the bolt element and the first fastening element, in one possible embodiment, the bolt element has a first contact surface which, in the mounted condition, is axially supported in the direction of the first fastening element against the bracket of the straw chopper shaft relative to the longitudinal axis of the bolt element. The brackets on straw chopper shafts are usually designed as welded-on bodies which are limited at their axial ends by largely flat axial surfaces relative to the longitudinal axis of the straw chopper shaft. However, it is also possible, that these axial surfaces are curved. The first contact surface of the bolt element can be complementary to the adjacent first axial surface, but at least in such a way that in the assembled and braced condition at least one of frictional locking or positive form-fitting locking between bolt element and bracket is provided.

Furthermore, for axial bracing, the first fastening element is indirectly supported via at least the first washer against the opposite second axial surface of the bracket. In an embodiment without a sleeve, the first flail is clamped between the first washer and the second axial surface of the bracket and is thus part of the indirect support of the first fastening element and is firmly supported by force locking. In a possible embodiment with a sleeve, the first flail sits on the first bearing shoulder of the sleeve. If the width of the first bearing shoulder of the sleeve is greater than the width of the first flail in the area of its bore, the sleeve is part of the indirect support of the first fastening element and is clamped between the first washer and the second axial surface of the bracket. The first flail is pendulum mounted around the longitudinal axis of the bolt element. If the width of the bearing shoulder of the sleeve is smaller than the width of the flail in the area of its bore, the first flail is clamped between the first washer and the second securing shoulder of the sleeve and is thus part of the indirect support of the first fastening element and is firmly supported by force locking.

For the rotationally fixed reception of the first securing shoulder of the bolt element and the second securing shoulder of the sleeve, in one possible embodiment, the anti-rotation element is designed as a clasp and comprises a first side wall having the first opening, a second side wall having the second opening, and a center web including the supporting surface. The clasp can be designed such that the center web of the anti-rotation element is arranged in the longitudinal direction of the bolt element between the first side wall and the second side wall of the anti-rotation element.

A radial positioning of the bolt element can be achieved by the bolt element having a first guide shoulder which can be inserted into the mounting hole of the bracket.

In an embodiment without an additional sleeve, the bolt element has a second bearing shoulder around which the first flail is mounted, in addition to the first guide shoulder which can be inserted into the mounting hole of the bracket. The bolt element is designed such that the second bearing shoulder is located on side of the bracket opposite to the first securing shoulder when the flail assembly is mounted and the bearing shoulder is smaller in width than that of the first flail in the area of its bore.

The embodiments explained so far describe the flail assembly through which one flail is attached to the bracket. A further possible embodiment comprises a second flail having a bore and seated with the bore on the bolt element, a second fastening element connected to a second free end portion of the bolt element, a second washer having a bore with the second washer seated on the bolt element, the second washer being disposed between the second fastening element and the second flail, the second washer being radially slotted, and a smallest cylindrical envelope of the second fastening element coaxial with a longitudinal axis of the bolt element has a smaller radius than the bore of the second flail. For the second fastening element, the previously described properties of the first fastening element shall apply analogously, for the second washer the properties of the first washer, for the second flail the properties of the first flail and for the second free end cut of the bolt element the properties of the first free end cut of the bolt element.

All previously described elements of the possible embodiments of the flail assembly in addition to the flails themselves may be made of a metallic material or a plastic.

According to a further aspect a straw chopper shaft comprises: a rotor, at least one flail assembly as described above, at least one bracket fixedly connected to the rotor and having an mounting hole through which the bolt element of the at least one flail assembly is passed. In the case of several brackets connected to the rotor, these can be distributed on the outer surface of the rotor in the longitudinal and circumferential directions. In particular, the distribution of the brackets may be uneven in the longitudinal direction in order to optimize the air flow for the distribution of the chopped material.

BRIEF DESCRIPTION OF THE DRAWINGS

Preferred embodiments are explained below using the drawing figures. In this

DETAILED DESCRIPTION OF THE INVENTION

FIGS. 1 to 6, which are jointly described, show a flail assembly 1 in a first embodiment according to the invention connected to a straw chopper shaft 2. To accommodate the flail assembly 1, the straw chopper shaft 2 comprises a bracket 3 with a mounting hole 4 on a rotor 16. A bolt element 8 with a first free end portion 12 coaxial with a longitudinal axis A is passed through the mounting hole 4, so that a first contact surface 10 of a first securing shoulder 9 is in contact with a first axial surface 5 of the bracket 3. The mounting hole 4 is circular in this embodiment. In general, however, the mounting hole 4 is defined by the agricultural machinery manufacturer and can also take a form other than round.

A sleeve 26, a first flail 23 having a circular bore 24, a first washer 20 having a circular bore 21, and a first fastening element 19 secured to a first free end portion 12 of the bolt element 8 are seated on the first free end portion 12 of the bolt element 8.

Figure 1:
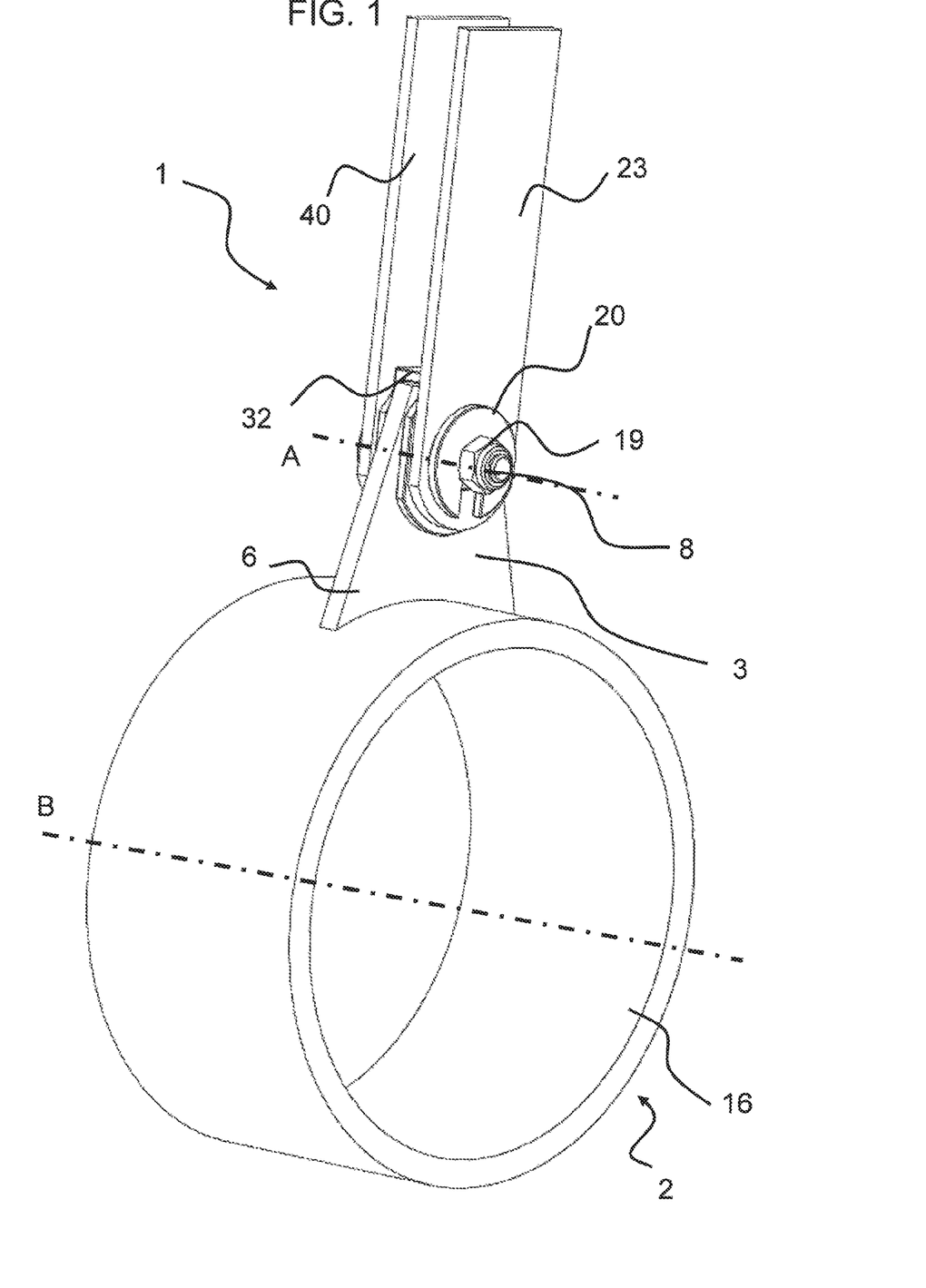
FIG. 1 shows a first embodiment of a flail assembly according to the invention in assembled condition on a straw chopper shaft in a perspective view.
Figure 2:
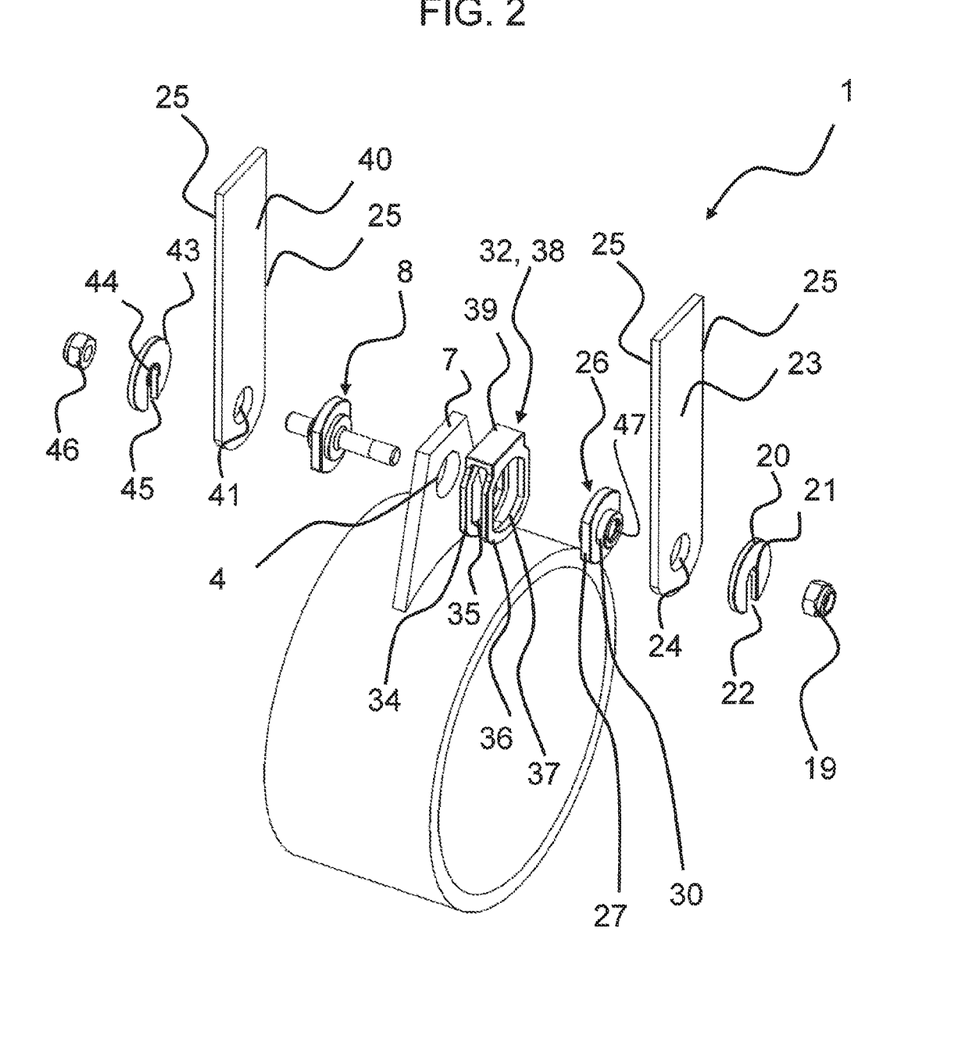
FIG. 2 shows a flail assembly according to FIG. 1 in an exploded view.
Figure 3:
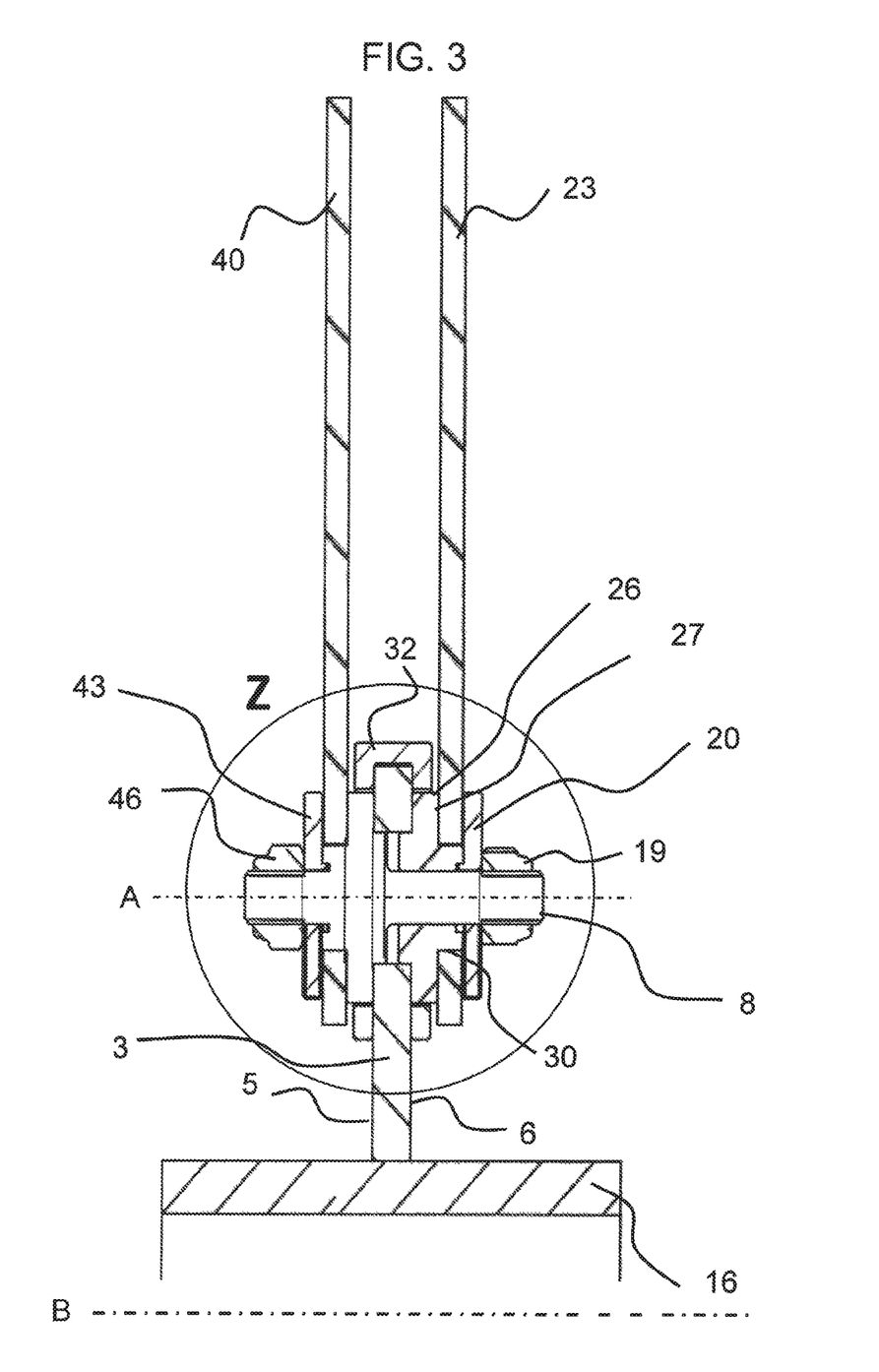
FIG. 3 shows flail assembly according to FIG. 1 in a longitudinal section in a plane spanned by the longitudinal axes A and B.
Figure 4:
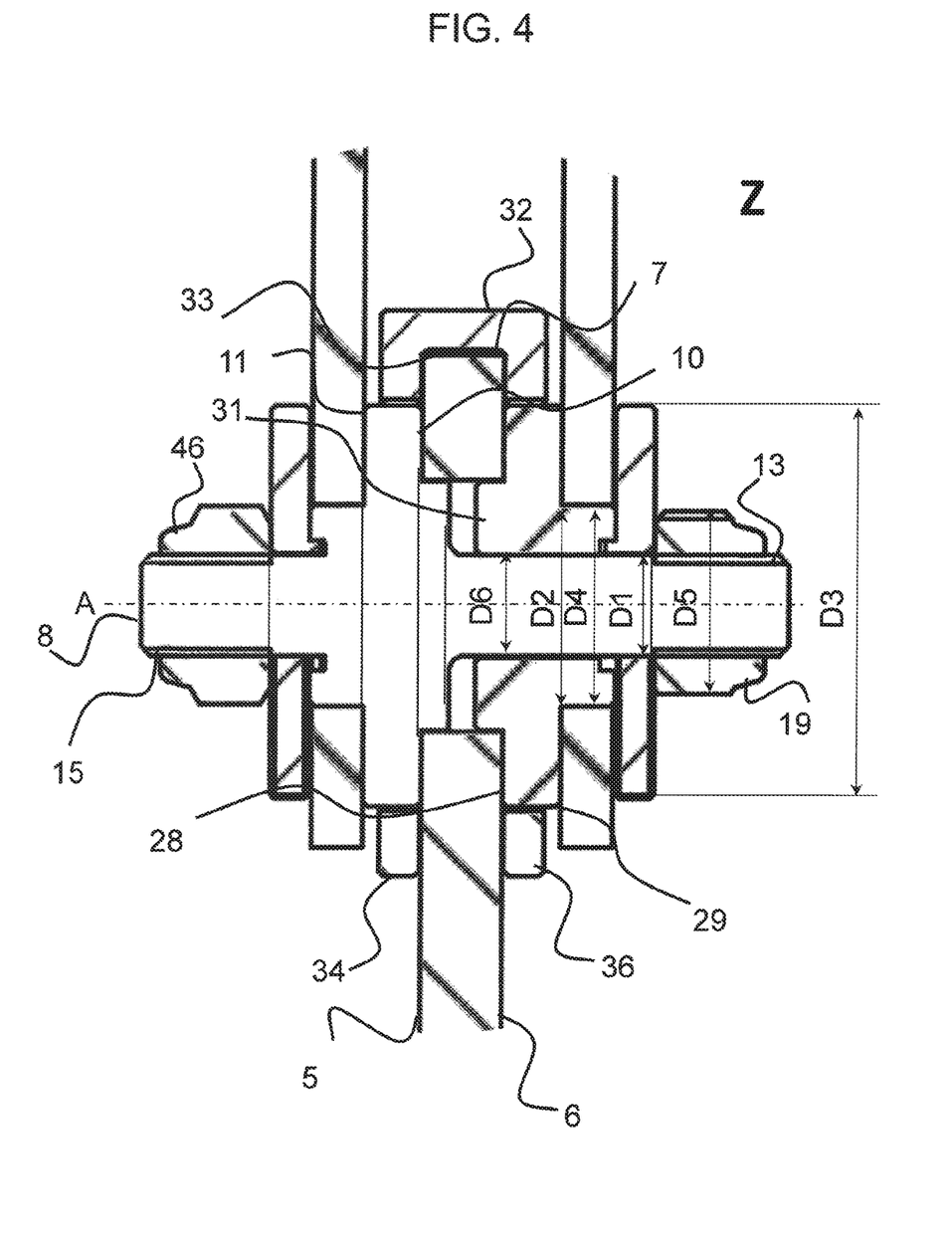
FIG. 4 shows the detail Z from FIG. 3.
Figure 5:
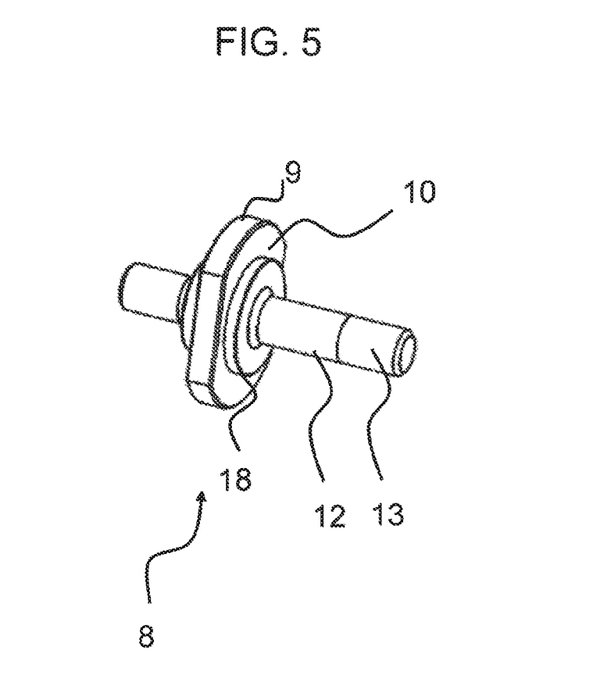
FIG. 5 shows the bolt element of the flail assembly according to FIG. 1 in a first perspective view.
Figure 6:
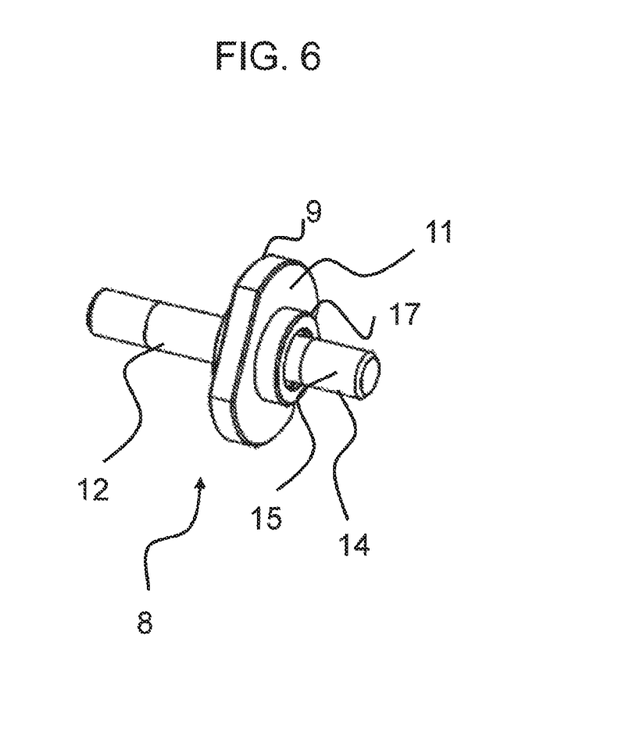
FIG. 6 shows the bolt element of the flail assembly according to FIG. 1 in a second perspective view.

The sleeve 26 has a second securing shoulder 27 with a first contact surface 28, whereby the first contact surface 28 is in contact with a second axial surface 6 of the bracket 3. As shown in FIG. 3, the sleeve 26 comprises a first bearing shoulder 30 which, on the side facing away from the bracket 3, is attached to the second securing shoulder 27 and on which the first 23 is radially positioned with the bore 24. The first bearing shoulder 30 has a greater width in the direction of the longitudinal axis A than the first flail 23 in the area of its bore 24. Thus the first washer 20, which is arranged on a side of the first flail 23 facing away from the bracket 3, is in contact with the first bearing shoulder 30 of the sleeve 26 by an abutment face. The bore 21 of the first washer 20 has a smaller diameter D1 than the outside diameter D2 of the first bearing shoulder 30 of the sleeve 26. The first flail 23 is thus pendulum mounted on the first bearing shoulder 30 and can be moved within the resulting axial clearance. In an alternative embodiment, the first bearing shoulder 30 may have a smaller width in the direction of the longitudinal axis A than the first flail 23 in the area of its bore 24, so that the first washer 20 is in contact with and is axially supported against the first flail 23. For this purpose the outer diameter D3 of the first washer 20 is larger than the diameter D4 of the bore 24 of the first flail 23. In this embodiment, in braced condition, which will be discussed later, the first flail 23 abuts on the second contact surface 29 of the sleeve 26. The first flail 23 is thus fixedly mounted on the first bearing shoulder 30. In the embodiment shown, the sleeve 26 also takes over the function of wear protection for the first flail 23 in relation to the bracket 3 and the sleeve 26 can be replaced easily by a spare part. The sleeve 26 is made of a metallic material, but it is also conceivable that it could be made of a plastic.

In the depicted embodiment the first flail 23 has a straight shape. Alternatively, the shape could also be curved respectively twisted, in order to optimize the resulting air flow. The first flail 23 has cutting edges 25, not depicted here in detail, on both of its long sides and is made of a metallic material, a ceramic material, a plastic, a plastic composite material or, in particular, a combination of these materials.

The first washer 20 has a slot 22 along a straight center line extending from the center of bore 21 to the radially outer edge. The slot 22 is wider at any point than the diameter of the area of the bolt element 8 on which the first washer 20 is seated in the assembled condition. In other embodiments, the shape of the center line may deviate from straight and may be curved, for example arched or S-shaped. The bore 21 is circular, but it can also be any other shape that allows a seat on the bolt element, for example polygonal. The first washer 20 is made of a metallic material. However, any other material is also conceivable that can withstand the pressures resulting from axial bracing, in particular plastics or plastic composites.

The first fastening element 19 is arranged to the right of the first washer 20 and it is designed as a self-locking hexagon nut. The internal thread of the nut receives a first thread 13 of the first free end portion 12 of bolt element 8.

For mounting the flail assembly 1 to the straw chopper shaft 2, the assembly is converted to an axially braced condition. To do this, the first fastening element 19 is tightened to the first thread 13. The first fastening element 19 is supported by its bearing surface 42 against the second axial surface 6 of the bracket 3 via the first washer 20 and the sleeve 26, while the bolt element 8 is supported by the first contact surface 10 of the first securing shoulder 9 against the first axial surface 5 of the bracket 3. In the above-described embodiment, in which the first flail 23 is fixedly mounted, the first flail 23 is additionally part of the indirect support of the first fastening element 19 against the second axial surface 6 of the bracket 3. The first contact surface 10 of the bolt element 8 and the first axial surface 5 of the bracket 3 as well as the first contact surface 28 of the sleeve 26 and the second axial surface 6 of the bracket 3 are most widely flat in the above-described embodiment. However, it is also possible, that these surfaces are bended complementary to each other.

Starting from the assembled-braced condition, the overall arrangement comprising the flail assembly 1 and the straw chopper shaft 2 can be transferred to an assembled-loosened condition in which the first fastening element 19 is loosened to such an extent that the axial bracing is relieved. For this purpose, the first free end portion 12 is that wide that a complete loosening of the first fastening element 19 from the first thread 13 is not necessary and the first fastening element 19 is still connected to the bolt element 8. In the assembled-loosened condition described above, the first flail 23 is still axially secured by the first washer 20. In order to axially release the first flail 23, the first washer 20 is pulled radially from the bolt element 8 via the slot 22. The diameter D4 of the bore 24 of the first flail 23 is chosen to be larger than the diameter D5 of a smallest, cylindrical envelope of the first fastening element 19 coaxial to a longitudinal axis A of the bolt element 8, so that the first flail 23 can be pulled axially over the first fastening element 19. Moreover, the diameter D5 of the envelope of the first fastening element 19 described above is also larger than the diameter D6 of the through bore 47 of the sleeve 26. In particular, in case the first fastening element 19 is a self-locking nut, then even after the first washer 20 and the first flail 23 have been removed, all other parts of the flail assembly 1 are secured to the bracket 3. After completely loosening the first fastening element 19, the flail assembly 1 can be removed from the straw chopper shaft 2.

In order to be able to transfer the overall arrangement comprising the flail assembly 1 and the straw chopper shaft 2 easily and preferably one-handedly into the assembled-braced condition; into the assembled-loosened condition and back into an un-assembled condition, the flail assembly 1 has an anti-rotation element 32. The anti-rotation element 32 is arranged in such a way that a supporting surface 33 of the anti-rotation element 32 is supported against a contact surface 7 of the bracket 3 and is therefore rotationally fixed with respect to the longitudinal axis A of the bolt element 8. The anti-rotation element 32 is designed as a clasp 38, which has a first side wall 34 and a second side wall 36 connected to each other via a center web 39 comprising the supporting surface 33. The first side wall 34 comprises a first opening 35, which is complementary to the outer contour of the first securing shoulder 9 of bolt element 8. The first side wall 34 is arranged such that the first securing shoulder 9 is enclosed by the first side wall 34. Thus the bolt element 8 is indirectly supported by the anti-rotation element 32 against the bracket 3 in the circumferential direction and is rotationally fixed with respect to its own longitudinal axis A. The bolt element 8 is thus supported on the bracket 3 in the circumferential direction by the anti-rotation element 32. Thus, the first fastening element 19 can be tightened or loosened with one hand, for example using a spanner.

The second side wall 36 comprises a second opening 37, complementary to the outer contour of the second securing shoulder 27 of the sleeve 26. The second side wall 36 is arranged such that the second securing shoulder 27 is enclosed by the second side wall 36. Thus, the sleeve 26 is indirectly supported in the circumferential direction by the anti-rotation element 32 against the bracket 3 and is rotationally fixed with respect to the longitudinal axis A of the bolt element 8. This reduces the relative movements and thus the resulting wear between the sleeve 26 and the first flail 23 in both the axial and radial contact areas.

The cross-sections of the first securing shoulder 9 of bolt element 8 and the second securing shoulder 27 of sleeve 26 are identical. As can best be seen in FIG. 5 and FIG. 6, the first securing shoulder 9 and the second securing shoulder 27 in cross-section are composed of an imaginary rectangular middle section and two circular segments which are connected at the two opposite short ends of the middle section. This embodiment provides a large effective contact surface under load between the first securing shoulder 9 and the first side wall 34 or the second securing shoulder 27 and the second side wall 36. It goes without saying that the outer contour of the first securing shoulder 9 or the second securing shoulder 27 and the respective complementary shapes of the first opening 35 and the second opening 37 can take on any shape other than a circle which allows a positive form-fit between the bolt element 8 or the sleeve 26 and the anti-rotation element 32. The bolt element 8 and the anti-rotation element 32 are made of a metallic material to minimize wear in the contact areas. However, it is also conceivable to manufacture the two components from a plastic or one of the components from a plastic and the other component from a metallic material.

In order to position the flail assembly 1 radially with respect to the straw chopper shaft 2, the bolt element 8 has a first guiding shoulder 18 and the sleeve 26 has a second guiding shoulder 31, which are each inserted into the mounting hole 4 of the bracket 3 and are complementary to the mounting hole 4, in particular circular. The width of the first guiding shoulder 18 and the second guiding shoulder 31 are smaller than half the width of the bracket 3 in the area of the mounting hole 4.

On the side of the first securing shoulder 9 facing away from the bracket 3, the bolt element 8 includes a second bearing shoulder 17, on which a second flail 40 with a bore 41 is seated, and a second free end portion 14 with a second thread 15. In contact to the second bearing shoulder 17, a second slotted washer 43 with a bore 44 sits on the second free end portion 14. A second fastening element 46 is designed as a self-locking nut and is connected to the second free end portion 14 via the second thread 15. For mounting the second flail 40 on the bracket 3, the second fastening element 46 is tightened such that it is transferred into an axially braced condition with the bolt element 8. For this purpose, the second fastening element 46 is supported by the second washer 43 against the second bearing shoulder 17. As with the first flail 23, the second flail 40 can be released axially by radially pulling off the second washer 43 in the assembled-loosened condition.

The second bearing shoulder 17 is wider than the second flail 40 in the area of its bore 41 and the second flail 40 is therefore pendulum mounted. Alternatively, the second bearing shoulder 17 could be narrower than the second flail 40 in the area of its bore 41 and the second flail 40 would then be fixedly mounted.

Since the bolt element 8 is supported against the bracket 3 in the circumferential direction by the anti-rotation element 32, the second fastening element 46 can be easily tightened and loosened in the same way as the first fastening element 19, especially with one hand.

In addition, for the second fastening element 46 the described properties of the first fastening element 19, for the second washer 43 the properties of the first washer 20 and for the second flail 40 the properties of the first flail 23 apply analogously.

Figure 7:
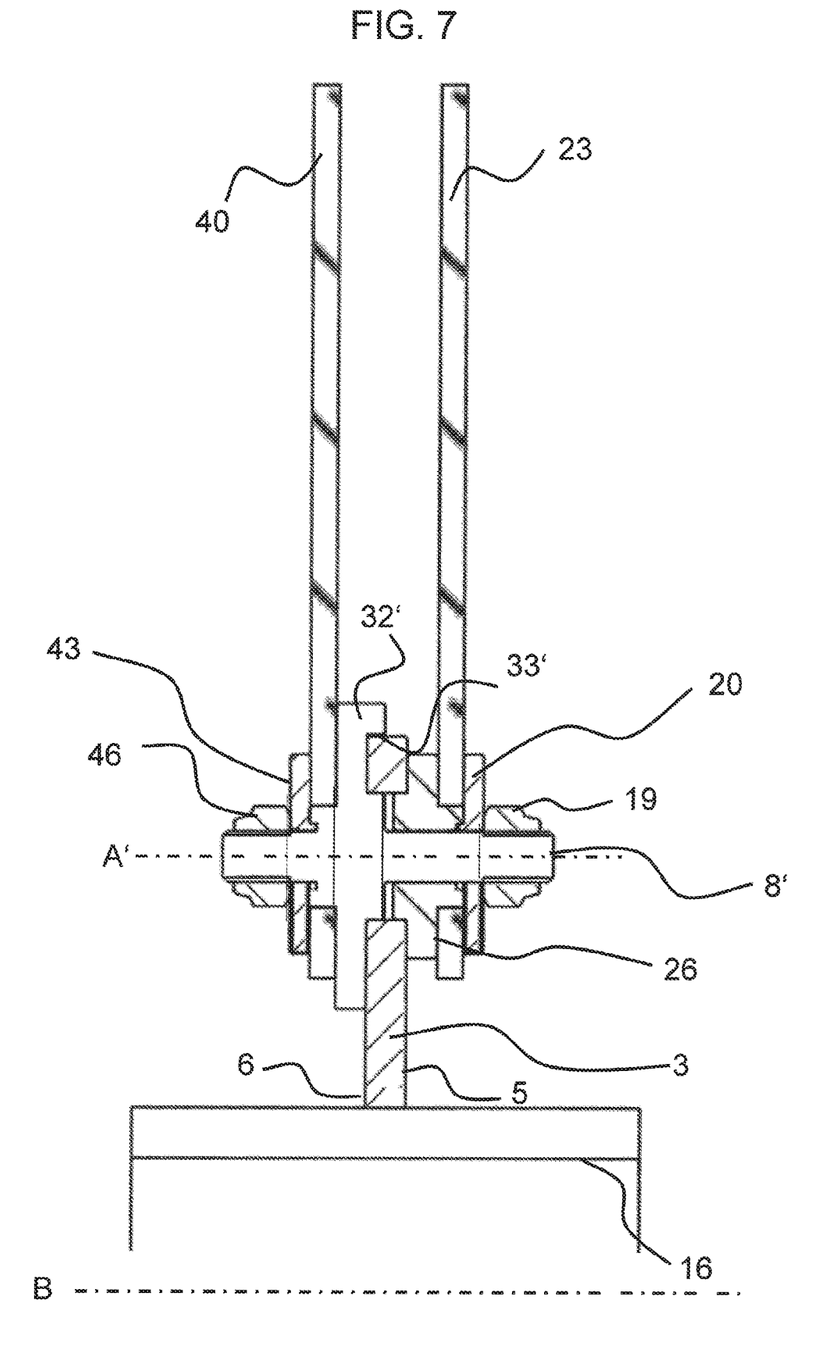
FIG. 7 shows a second embodiment of a flail assembly according to the invention in assembled condition on a straw chopper shaft in a longitudinal section in a plane spanned by the longitudinal axes A' and B.
Figure 8:
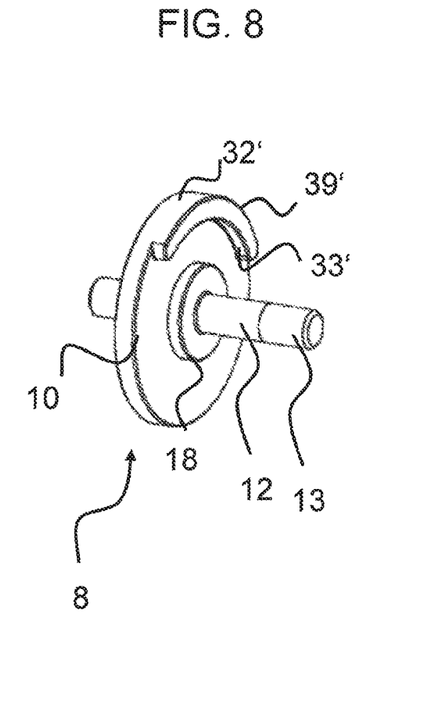
FIG. 8 shows the bolt element of the flail assembly according to FIG. 7 in a first perspective view.
Figure 9:
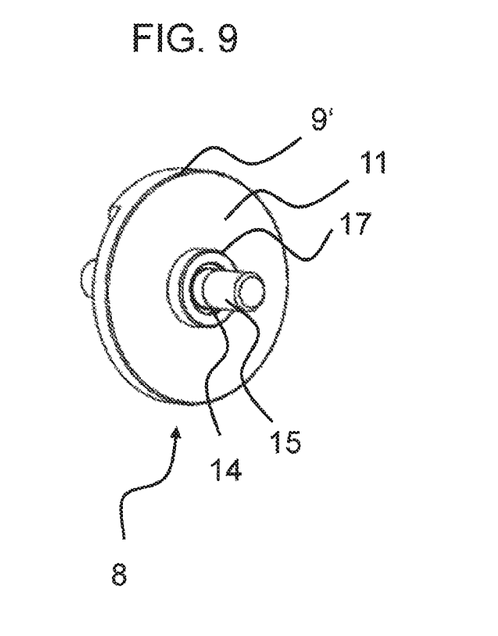
FIG. 9 shows the bolt element of the flail assembly according to FIG. 7 in a second perspective view.

FIGS. 7 to 9, which are described jointly as follows, show a second flail assembly according to the invention. This corresponds as far as possible to the embodiment according to FIGS. 1 to 6, so that reference is made to the description above with regard to the common features. The same or similar details are marked with the same reference marks as in FIGS. 1 to 6 and are described there.

In the embodiment shown, the anti-rotation element 32' is designed in one piece with the bolt element 8' and, in contrast to the embodiment of the flail assembly described first, does not have a second side wall. The center web 39' of the anti-rotation element 32' extends in the axial direction as a circular ring segment radially outward from the circular first securing shoulder 9' and has a supporting surface 33'. The bolt element 8' is supported by the supporting surface 33' on the contact surface 7 of the bracket 3 in the circumferential direction relative to its own longitudinal axis A and is therefore rotationally stable.

REFERENCE SIGN LIST

1 flail assembly
2 straw chopper shaft
3 bracket
4 mounting hole
5 first axial surface of the bracket
6 second axial surface of the bracket
7 contact surface of the bracket
8, 8' bolt element
9, 9' first securing shoulder
10 first contact surface
11 second contact surface
12 first free end portion
13 first thread
14 second free end portion
15 second thread
16 rotor
17 second bearing shoulder
18 first guiding shoulder
19 first fastening element
20 first washer
21 bore
22 slit
23 first flail
24 bore
25 cutting edge
26 sleeve
27 second securing shoulder
28 first contact surface
29 second contact surface
30 first bearing shoulder
31 second guiding shoulder
32, 32' anti-rotation element
33, 33' supporting surface
34 first side wall
35 first opening
36 second side wall
37 second opening
38 clasp
39, 39' center web
40 second flail
41 bore
42 bearing surface
43 second washer
44 bore
45 slot
46 second fastening element
47 through bore of the sleeve
A, A' Longitudinal axis of the bolt element 8, 8'
B Longitudinal axis of the straw chopper shaft 2
D1 Bore diameter 21
D2 Outer diameter of first bearing shoulder 30
D3 Outer diameter of first washer 20
D4 Bore diameter 24
D5 Diameter of first fastening element enveloping 19
D6 Diameter of through hole 47

The invention claimed is:

1. A flail assembly for a straw chopper shaft with a mounting hole in a bracket comprising:
   a bolt element which can be passed through the mounting hole of the bracket,
   an anti-rotation element by means of which the bolt element can be supported on the bracket against rotation,
   a first flail having a bore with which the first flail is seated on the bolt element,
   a first fastening element connected to a first free end portion of said bolt element, and a first washer having a bore with which the first washer sits on the bolt element, the first washer being disposed between the first fastening element and the first flail,
wherein the first washer is radially slotted, and
wherein the bolt element is axially braced with the first fastening element and the first washer with respect to a longitudinal axis of the bolt element, and
wherein a smallest cylindrical envelope of the first fastening element, coaxial with the longitudinal axis of the bolt element, has a smaller radius than the bore of the first flail such that the first flail can be pulled over the first fastening element in an axial direction.

2. The flail assembly according to claim 1,
wherein the first free end portion of the bolt element has at least partially a first thread, and
wherein the first fastening element is a nut.

3. The flail assembly according to claim 1,
wherein the bolt element has a first contact surface with which the bolt element in assembled condition is supported axially against the bracket of the straw chopper shaft in the direction of the first fastening element, relative to the longitudinal axis of the bolt element.

4. The flail assembly according to claim 1,
wherein the anti-rotation element has a supporting surface which, in the assembled condition, is supported against the bracket of the straw chopper shaft in the circumferential direction, relative to the longitudinal axis of the bolt element.

5. The flail assembly according to claim 1,
wherein the bolt element has a first securing shoulder, the cross-section of which differs from a circular shape, and
wherein the anti-rotation element has a first opening which is designed complementary to the first securing shoulder and receives the first securing shoulder in a rotationally fixed manner in the assembled condition.

6. The flail assembly according to claim 5,
wherein the first securing shoulder of the bolt element has in cross-section a rectangular central part, at the two opposite short ends of which circular segments are connected.

7. The flail assembly according to claim 5,
wherein a sleeve with a second securing shoulder, the cross-section of which deviates from a circular shape, and a first bearing shoulder, on which the first flail is radially mounted, sits on the bolt element, and
wherein the anti-rotation element has a second opening which is designed complementary to the second securing shoulder and accommodates the second securing shoulder in a rotationally fixed manner in the assembled condition.

8. The flail assembly according to claim 7,
wherein the anti-rotation element is a clasp, comprising:
a first side wall having said first opening,
a second side wall having said second opening, and
a center web having said support surface.

9. The flail assembly according to claim 8,
wherein the center web of the anti-rotation element is arranged with respect to the longitudinal axis of the bolt element between the first side wall and the second side wall of the anti-rotation element.

10. The flail assembly according to claim 1,
wherein the bolt element is one piece with the anti-rotation element and has a supporting surface which, in the assembled condition, is supported on the bracket of the straw chopper shaft in the circumferential direction, relative to the longitudinal axis of the bolt element.

11. The flail assembly according to claim 1,
wherein the bolt element has a first guide shoulder which can be inserted into the fastening opening of the bracket.

12. The flail assembly according to claim 1,
wherein the bolt element has a first guiding shoulder, which can be inserted into the mounting hole of the bracket, and a second bearing shoulder, on which the first flail is mounted.

13. The flail assembly according to claim 1,
wherein a second flail has a bore and is seated with the bore on the bolt element,
wherein a second fastening element is connected to a second free end portion of said bolt element,
wherein a radially slotted second washer has a bore with which the second washer sits on the bolt element, and is disposed between the second fastening element and the second flail, and
wherein a smallest cylindrical envelope of the second fastening element co-axial with the longitudinal axis of the bolt element has a smaller radius than the bore of the second flail.

14. A straw chopper shaft comprising:
a rotor,
at least one flail assembly according to claim 1, and
at least one bracket which is firmly connected to the rotor and has a mounting hole through which the bolt element of the at least one flail assembly is guided.

15. A flail assembly for a straw chopper shaft with a mounting hole in a bracket comprising:
a bolt element which can be passed through the mounting hole of the bracket,
an anti-rotation element by means of which the bolt element can be supported on the bracket against rotation,
a first flail having a bore with which the first flail is seated on the bolt element,
a first fastening element connected to a first free end portion of said bolt element, and
a first washer having a bore with which the first washer sits on the bolt element, the first washer being disposed between the first fastening element and the first flail,
wherein the first washer is radially slotted, and
wherein the bolt element is axially braced with the first fastening element and the first washer with respect to a longitudinal axis of the bolt element, and
wherein a smallest cylindrical envelope of the first fastening element, coaxial with the longitudinal axis of the bolt element, has a smaller radius than the bore of the first flail,
wherein the bolt element has a first securing shoulder, the cross-section of which differs from a circular shape, and
wherein the anti-rotation element has a first opening which is designed complementary to the first securing shoulder and receives the first securing shoulder in a rotationally fixed manner in the assembled condition.

16. A flail assembly for a straw chopper shaft with a mounting hole in a bracket comprising:
a bolt element which can be passed through the mounting hole of the bracket,
an anti-rotation element by means of which the bolt element can be supported on the bracket against rotation,
a first flail having a bore with which the first flail is seated on the bolt element, a first fastening element connected to a first free end portion of said bolt element, and a first washer having a bore with which the first washer sits on the bolt element, the first washer being disposed between the first fastening element and the first flail, wherein the first washer is radially slotted, and wherein the bolt element is axially braced with the first fastening element and the first washer with respect to a longitudinal axis of the bolt element, and wherein a smallest cylindrical envelope of the first fastening element, coaxial with the longitudinal axis of the bolt element, has a smaller radius than the bore of the first flail, wherein the bolt element is one piece with the anti-rotation element and has a supporting surface which, in the assembled condition, is supported on the bracket of the straw chopper shaft in the circumferential direction, relative to the longitudinal axis of the bolt element.

* * * * *